US012601936B2

(12) United States Patent
Eul et al.

(10) Patent No.: US 12,601,936 B2
(45) Date of Patent: Apr. 14, 2026

(54) POLARIZATION MODULATOR WITH SEPARATE OPTICAL SECTIONS

(71) Applicant: Tesat-Spacecom GmbH & Co. KG, Backnang (DE)

(72) Inventors: Silas Eul, Backnang (DE); Julian Struck, Backnang (DE); Thomas Hiemstra, Backnang (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 322 days.

(21) Appl. No.: 18/521,068

(22) Filed: Nov. 28, 2023

(65) Prior Publication Data

US 2025/0172828 A1 May 29, 2025

(30) Foreign Application Priority Data

Nov. 29, 2022 (DE) .......................... 102022131465.0

(51) Int. Cl.
*G02F 1/01* (2006.01)
*G02F 1/03* (2006.01)
(Continued)

(52) U.S. Cl.
CPC .......... *G02F 1/0136* (2013.01); *G02F 1/0311* (2013.01); *G02F 1/076* (2013.01); *H04B 10/40* (2013.01)

(58) Field of Classification Search
USPC ................................................ 359/279, 246
See application file for complete search history.

(56) References Cited

U.S. PATENT DOCUMENTS

| | | | |
|---|---|---|---|
| 6,333,808 B1 | 12/2001 | Webb et al. | |
| 7,643,760 B1 * | 1/2010 | Han ..................... | H04B 10/677 |
| | | | 385/11 |
| 2024/0039633 A1 * | 2/2024 | Struck ................ | H04B 10/2587 |

FOREIGN PATENT DOCUMENTS

| | | |
|---|---|---|
| EP | 1330054 A2 | 7/2003 |
| EP | 1330054 A3 | 4/2005 |

OTHER PUBLICATIONS

German Search Report for Application No. 10 2022 131 465.0 dated Sep. 18, 2023, 2 pages. [See p. 2, categorizing the cited reference].
(Continued)

*Primary Examiner* — Dung T Nguyen
(74) *Attorney, Agent, or Firm* — Lerner David LLP

(57) ABSTRACT

A modulator unit includes a light source, a phase modulator, a polarization component separator, and a reflector. The light source emits an optical signal with two polarization components with their respective polarization direction to the polarization component separator. The polarization component separator sends the polarization components via different optical sections that have different signal propagation times, whereby the polarization components have a relative time offset. The phase modulator modulates a phase of the first polarization component in the first polarization direction and transfers it to the reflector. The reflector retroreflects both polarization components and changes their respective polarization in the process. The polarization components run through the phase modulator again. The phase modulator modulates a phase of the second polarization component in the first polarization direction. The polarization component separator eliminates the time offset between the polarization components. The modulator unit outputs the modulated optical signal as polarization-modulated output signal.

12 Claims, 2 Drawing Sheets

(51) Int. Cl.
   *G02F 1/07*      (2006.01)
   *H04B 10/40*     (2013.01)

(56)                  References Cited

OTHER PUBLICATIONS

X. Liu, C. Liao et al.: "Polarization coding and decoding by phase modulation in polarizing Sagnac interferometers", Proc. Spie, Bd. 6827, Nov. 26, 2007 (Nov. 26, 2007), Seiten 68270I-I-68270I-I, XP040249795.

Costantino, Agnesi et al: "All-fiber autocompensating polarization encoder for Quantum Key Distribution", arxiv.org, Cornell University Library, 201 Olin Library Cornell University Ithaca, NY 14853, Mar. 2, 2019 (Mar. 2, 2019), XP081125155.

Extended European Search Report including Written Opinion for Application No. 23210231.9 dated Apr. 29, 2024, pp. 1-6. (see p. 2, categorizing the cited references).

\* cited by examiner

POLARIZATION MODULATOR WITH SEPARATE OPTICAL SECTIONS

FIELD OF THE INVENTION

The present description relates to optical signal generation and signal transmission, in particular the transmission of information by means of polarization modulation. Specifically, the description relates to a modulator unit for modulating the polarization of an optical signal, to an optical signal transmission path having such a modulator unit, and to a system having such a modulator unit, for example in the form of a satellite.

BACKGROUND OF THE INVENTION

Information can be transmitted by technical means by virtue of an information unit being assigned to a specific state of a carrier signal. The carrier signal is usually an electromagnetic wave from a specific spectral range. A property of the carrier signal now is modified in order to impress a piece of information onto the carrier signal. In this case, the change per se or the state of the carrier signal following the change corresponds to the information to be transmitted. The carrier signal is usually modified at time intervals in order thereby to transmit a plurality of information units.

Depending on the carrier signal, different physical features of the carrier signal come into question as information carrier, for example: the amplitude, the frequency, the phase, and/or the polarization. If one of these features is modified over time, then this process is referred to as modulation.

Various technical components are used on the signal processing path in order to process the carrier signal and introduce the desired information into the carrier signal, before the carrier signal is transmitted over the transmission path (along a wire or wirelessly).

The components used during the preparation and processing of the carrier signal serve to appropriately modulate the carrier signal so that the information to be transmitted is correctly applied to the carrier signal and transmitted over the transmission path with as little disturbance and as a few losses as possible.

Now, however, the situation may arise where there are also unwanted changes to the carrier signal in addition to the desired modulation (change in the carrier signal), for example by parasitic effects or other unwanted properties of the components involved in the preparation of the carrier signal. In this case, what change of the carrier signal was based on the desired modulation and what change was caused by unwanted effects is not always identifiable at a receiver of the carrier signal. This may have a negative influence on the quality of the signal.

BRIEF SUMMARY OF THE INVENTION

Using this as a starting point, the object can be considered that of reducing or eliminating the influence of unwanted effects of a modulator unit on a carrier signal modulated for transmission purposes. In particular, the object can be considered that of avoiding polarization errors in the case of a polarization-modulated optical signal.

According to one aspect, a modulator unit for modulating the polarization of an optical signal is specified. The modulator unit comprises a light source, a polarization component separator, a phase modulator (which is a polarization-dependent phase modulator in particular, but may also be a polarization-independent phase modulator), and a reflector. The light source is designed to output an optical signal and emit the latter as an input signal in the direction of the polarization component separator, wherein the optical signal contains a first polarization component with a first polarization direction and a second polarization component with a second polarization direction. The polarization component separator is designed to separate the first polarization component from the second polarization component and transmit the first polarization component via a first optical section and the second polarization component via a second optical section. The first optical section is assigned a first signal propagation time and the second optical section is assigned a second signal propagation time, the first signal propagation time differing from the second signal propagation time, which is to say that the first signal propagation time is longer or shorter than the second signal propagation time. As a result of the difference between the first signal propagation time and the second signal propagation time, the polarization component separator is designed to introduce a time offset between the first polarization component and the second polarization component and transmit the first polarization component and the second polarization component on a joint optical path to the phase modulator. The phase modulator is designed to modulate a first phase of the first polarization component in the first polarization direction and transfer the modulated first polarization component to the reflector. The reflector is designed to retroreflect both the first polarization component and the second polarization component in the direction of the phase modulator and in the process modify the respective polarization (for example through 90°) such that the first polarization component with the first polarization direction receives the second polarization direction and the second polarization component with the second polarization direction receives the first polarization direction. The phase modulator is designed to modulate a second phase of the retroreflected second polarization component in the first polarization direction and transmit the retroreflected first polarization component and the retroreflected second polarization component to the polarization component separator. The polarization component separator is designed to eliminate the time offset between the retroreflected first polarization component and the retroreflected second polarization component and output the retroreflected first polarization component and the retroreflected second polarization component without a time offset via a joint optical path. The modulator unit is designed to output the optical signal modulated thus as polarization-modulated output signal.

The first polarization component and the second polarization component are separated from one another in time during the first pass of the phase modulator. Therefore, the second polarization component may be modulated or may not be modulated during the first pass of the phase modulator. Then, subsequently, both the first polarization component and the second polarization component are transferred to the reflector.

The optical signal generated and output by the light source represents, as a matter of principle, a superposition of two orthogonal polarization components. The phase modulator is designed to apply a respective desired phase to each polarization component.

In principle, the light source can be a light emitter (for example a laser) or the output of a light-guiding element. In an exemplary embodiment, the optical signal traverses the same optical path of the modulator unit twice in opposite directions. In the first passage, the optical signal or its polarization components travel from the light source to the reflector through the polarization component separator and the phase modulator. The reflector retroreflects the optical signal and rotates the phase of the optical signal through 90° (either +90° or −90°) in the process. For example, the reflector is implemented as a Faraday mirror that is a retroreflector based on the Faraday effect which contains a crystal to which a magnetic field has been applied and which rotates the polarization depending on the direction of propagation of the magnetic field. For example, if horizontally polarized light is incident on the reflector, said light is retroreflected as vertically polarized light. Thus, the reflector is the combination of a Faraday rotator and a mirror. The Faraday rotator is initially passed by the optical signal and the polarization of the light is rotated through 45° (+45° or −45°) in the process. Then, the optical signal is reflected and passes through the Faraday rotator again, with the polarization of said signal being rotated through a further 45° (in the same direction as in the first step). Overall, the polarization of the retroreflected light then differs from the polarization of the incident light by 90°.

Precisely because the optical signal or its polarization components pass twice through the phase modulator with interchanged polarization directions and a time offset between the polarization components, the phase modulator initially acts on the polarization component to be modulated and the time-delayed polarization component passes the phase modulator either without an active influence on its phase, or else it may also be modulated during the first passage. In the case of a polarization-dependent phase modulator, the second polarization component is initially not modulated (because the second polarization component has a different polarization direction to the first polarization component), but in the case of a polarization-independent phase modulator, the second polarization component may also be modulated during the first passage.

A few examples are described below with reference to a polarization-dependent phase modulator. However, it should be understood that the principle described here can also be implemented using a polarization-independent phase modulator.

As a result, parasitic influences of the modulator unit on the polarization components of the optical signal and error phases are eliminated.

By way of example, during the first passage, the component of the optical signal with horizontal polarization (assumed as first polarization direction for the example) is modulated (a first phase is modulated onto this component) and the component with vertical polarization (assumed as second polarization direction for the example) passes the phase modulator without changes being made to the phase of this component. Now, the optical signal is retroreflected by the reflector and the polarization is rotated through 90°; the component with horizontal polarization is now polarized vertically and the component with vertical polarization is now polarized horizontally. During the second passage, the optical signal with its polarization components passes through the phase modulator again, and now the (now) horizontally polarized component (corresponding to the vertically polarized component of the first passage) is modulated in terms of its phase and the (now) vertically polarized component passes the phase modulator without any further change to its phase. This means that the phase modulator has only a single modulation axis which remains the same for the first and second passage of optical signals, which is to say acts on the same polarization direction.

If an error phase (or an erroneous phase shift) is introduced into the optical signal during the first passage, for example by virtue of the phase of the horizontally polarized component being parasitically influenced in a different way to the phase of the vertically polarized component, then this error phase cancels itself out during the second passage because the optical signal, with a polarization rotated through 90°, passes over the same optical path and the same error phase is now applied to the respective other polarization axis. In this way, all relative phase errors are introduced in both polarization axes in the same way. Moreover, a parasitic influence on the polarization component away from the polarization axis of the phase modulator is avoided as a result of the time delay between the two polarization components.

The phase applied to the horizontally polarized component of the second passage is referred to as second phase because the first phase is contained in the vertically polarized component of the optical signal during the second passage and the first phase may differ in relation to the second phase.

In the example reproduced here, reference is made in a specific way to horizontally and vertically polarized components of the optical signal, specifically that the horizontally polarized component is respectively phase modulated during the first and second passage through the phase modulator. However, it is understood that this example is nonlimiting and the phase modulator can phase modulate the vertically polarized component or any other component of the optical signal rather than the horizontally polarized component. What is decisive is that the polarization components have a time offset with respect to one another and the polarization of the two polarization components is in each case rotated through 90° between the two processes in which the phase of one polarization component of the optical signal is modulated.

As a result, both the vertically polarized component and the horizontally polarized component of the optical signal are modulated in a modulator unit in the case of this construction. Overall, the resultant optical signal has received a desired polarization modulation by virtue of the first polarization component with a first polarization direction being modulated in terms of its phase during the first passage and the second polarization component, which has the first polarization direction during the second passage, being modulated in terms of its phase during the second passage, wherein however the polarization of the optical signal during the second passage has been modified by 90° in comparison with the first passage.

By way of example, the phase modulator used here is a phase-modifying modulator which acts on a polarization component of an optical signal, which is to say that the phase modulator changes the phase of two mutually orthogonal polarization components of the optical light. By way of example, the phase modulator is an electro-optic modulator, EOM. It is to be understood that any reference to an EOM in this description is purely by way of example and, in principle, applies to any phase modulator, which may be polarization dependent or polarization independent.

By way of example, the phase modulator has two optical axes aligned orthogonal to one another. By means of electrical energy, for example an applied voltage, along one of these optical axes (this is the polarization axis), the refractive index of the latter is modified and this results in a phase change in the polarization component of the optical signal vis-à-vis the other or orthogonal optical axis.

The modulator unit structure is very space saving and compact as a result of the use of a Faraday mirror. A phase modulator can be switched very quickly, with the result that the modulator unit described here can be used up into high frequency ranges, for example several 10 GHz, for example up to 30 to 40 GHz or even higher frequency ranges.

Using the modulator unit described here, it is possible to set different polarization states of an optical signal. In the process, it is possible for example to set different discrete states of the polarization by virtue of the phase of the horizontally polarized polarization component of the optical signal being modified in relation to the phase of the vertically polarized polarization component of the optical signal. However, in principle, the polarization of the optical signal can be modified continuously as desired as a linear combination of the two polarization components, without being restricted to a limited number of polarization states.

The polarization component separator contributes to parasitic effects of the phase modulator on a non-modulated polarization component being prevented. In principle, a phase modulator may also have parasitic or unwanted effects on optical signals with such a polarization direction whose polarization direction is away from the polarization axis of the phase modulator and which in principle should accordingly be allowed to pass uninfluenced by the phase modulator.

Thus, on occasion, a polarization-dependent phase modulator which should only modulate horizontally polarized light may also influence vertically polarized light. The latter is an unwanted/parasitic effect. However, this effect may lead to inaccuracies and errors in the modulation. To eliminate this effect, it is presently proposed that an optical signal is split into polarization components with different polarization directions, a time offset is introduced between these two polarization components, and the latter then pass the phase modulator in succession. The phase modulator is controlled such that it only modulates the polarization component that should be modulated in each case. For example, the phase modulator is controlled such that it applies a modulation when horizontally polarized light passes the phase modulator. By contrast, the phase modulator is not active when vertically polarized light passes the phase modulator, which is to say it does not have a modulating effect on the corresponding signal. This prevents an unwanted modulation or falsification from being introduced into the vertically polarized polarization component. The polarization components are polarized in different directions and pass the phase modulator with temporal spacing. The phase modulator applies a modulation to only one polarization component. No modulation is applied or the phase modulator is not active when the polarization component not to be modulated passes the phase modulator. The reflector reflects the optical signals back to the phase modulator and changes the polarization direction of the polarization components. The first polarization component receives the second polarization direction, and the second polarization component receives the first polarization direction. Both polarization components pass through the phase modulator again. However, the phase modulator now acts on the other polarization component because the respective polarization direction has been modified and the phase modulator maintains its polarization axis. Subsequently, the time offset is eliminated and the two polarization components are output via a joint optical path. Both polarization components now contain a desired phase information modulated thereon, and an optical signal containing both polarization components is output.

In other words and in a nonlimiting example, the mode of operation of the modulator unit can be described as follows:

The phase modulator is designed to apply a phase modulation only to the first polarization component before the two polarization components are incident on the reflector and to apply a phase modulation only to the second polarization component after the reflector has reflected the two polarization components. During the first passage, which is to say when the optical signal passes the phase modulator for the first time, the first polarization component with the first polarization direction (for example the horizontal polarization direction) is modulated by the phase modulator and the second polarization component with the second polarization direction (for example the vertical polarization direction) is transmitted unchanged. During the second passage, after the reflector has reflected the polarization components and changed their polarization direction, the second polarization component, which now has the first polarization direction (the horizontal polarization direction in this example), is modulated by the phase modulator and the second polarization component, which now has the second polarization direction (the vertical polarization direction in this example), is transmitted unchanged.

According to an embodiment, the first optical section has a first optical path length and the second optical section has a second optical path length, the first optical path length differing from the second optical path length.

As a matter of principle, the time delay between the two polarization components can be introduced in different ways. In very general terms, this is implemented by different signal propagation times over the two optical sections. By way of example, these different signal propagation times can be introduced by virtue of using a retardation element. However, the time delay can also be introduced by virtue of the optical sections having different physical designs, for example different optical path lengths. Fibers of different lengths can be used for a fiber-connected optical section. It is also conceivable that a single polarization-maintaining optical fiber is used for both polarization components, with the precondition that this optical fiber has different refractive indices on the different polarization axes, ensuring the time delay. In the case of a free beam, the elements used for the transmission of the optical free beam can be positioned at different distances from one another, in order to obtain different optical propagation times of the optical signals over the optical sections.

According to a further embodiment, the polarization component separator comprises a first polarizing beam splitter and a second polarizing beam splitter, wherein the first optical section and the second optical section are arranged between the first polarizing beam splitter and the second polarizing beam splitter.

Each polarizing beam splitter has a first interface and a second interface. Optical signals incident on the polarizing beam splitter at the first interface are split into polarization components depending on their polarization direction, the said polarization components then being steered at the second interface via the first optical section or via the second optical section, with the result that polarization components with different polarization directions pass over different optical sections. Conversely, optical signals which, with appropriate polarization direction, are incident on the corresponding polarizing beam splitter at the second interface via the two optical sections are merged and output at the first interface via a joint optical path.

In the polarization component separator, an optical signal from the light source is initially incident on the first polarizing beam splitter. This first polarizing beam splitter splits the optical signal into the first polarization component with the first polarization direction and the second polarization component with the second polarization direction. The first polarization component is guided via an optical section, for example via the first optical section. The second polarization component is guided via the other optical section, for example via the second optical section. A relative time offset is introduced between the two polarization components on account of the different signal propagation times over the optical sections. Now, the two polarization components reach the second beam splitter, which merges the incident polarization components again and transfers these to the phase modulator via a joint optical path. The polarization components pass the phase modulator in succession with temporal spacing. One polarization component is modulated; the other one is transmitted unchanged. The polarization components subsequently arrive at the reflector, which reflects the polarization components and changes their polarization directions in the process. By way of example, an optical signal with a horizontal polarization direction is modified such that it is vertically polarized, and vice versa. The reflector provides the first polarization component with the second polarization direction and provides the second polarization component with the first polarization direction. On the return path, the phase modulator now modulates the second polarization component and allows the first polarization component to pass unchanged. There still is a time offset between the two polarization components. This time offset is eliminated when the polarization components pass through the polarization component separator the second time and in the opposite direction. The polarization components are incident on the second polarizing beam splitter. The latter guides the polarization components, now with modified polarization directions, over the optical sections in such a way that the polarization components now pass over the optical section that they did not pass over on the way to the phase modulator. By way of example, the first polarization component is temporally retarded during the first passage, and the second polarization component is temporally retarded during the second passage. Since the polarization components pass through the polarization component separator in opposite directions, they are each subject to the same time delay. The relative time offset has been eliminated after the polarization components have passed through the polarization component separator twice and in opposite directions.

In summary: to modulate the polarization components, the polarization components of an optical signal are initially separated and a time offset is introduced between the polarization components. The polarization components pass through the phase modulator twice and with modified polarization directions in each case. The first polarization component is modulated during the first passage, and the second polarization component is modulated during the second passage. Then, the time offset is eliminated and the two polarization components are merged, in order then to be output as phase-modulated optical signal.

According to a further embodiment the phase modulator comprises a crystal designed to have a voltage applied thereto and designed to change its refractive index in the process, whereby the phase of the first polarization component and/or second polarization component of the optical signal is modified. However, the refractive index can also be modified by virtue of applying a stress.

For example, the phase modulator may contain a birefringent medium which changes the phase of an optical signal passing through the optical medium when a stress/voltage is applied.

According to a further embodiment, the modulator unit is designed to the vary the voltage applied to the crystal over time.

For example, the modulator unit contains a power supply which provides a specifiable voltage. A control unit controls the power supply so that the latter provides a desired voltage at the phase modulator. The phase between the differently polarized components of the optical signal is modified by the time-varying voltage at the phase modulator.

According to a further embodiment, an absolute value of the first phase of the first polarization component of the input signal in the first polarization direction differs from an absolute value of the second phase of the second polarization component of the retroreflected optical signal in the first polarization direction.

In other words, this means that the phase modulator modulates a different phase on the horizontally polarized component of the optical signal during the first passage than on the then horizontally polarized component of the retroreflected signal during the second passage. This changes the polarization of the output signal of the modulator unit.

According to a further embodiment, the phase modulator is designed to change a difference between the first phase and the second phase over time.

By virtue of the phase modulator changing the difference in the phases over time during the first passage and during the second passage, the polarization of the output signal is likewise modified over time.

Overall, the polarization of the output signal of the modulator unit is freely settable between two linear polarizations (diagonal/antidiagonal, or else horizontal, vertical with the use of an additional wave plate at the output of the polarization modulator) and two circular polarizations (Z+ and Z−). However, the polarization may also be set continuously to any elliptic state located between the discrete states.

According to a further embodiment, the light source is designed to emit or output light with a well-defined optical mode. In the present context, the polarization and coherence properties of the optical signal are important. By way of example, the light source is a laser.

Lasers are distinguished in that they are able to emit optical signals with a well-defined polarization. As a result, they are particularly suitable for applications as described herein.

According to a further embodiment, the modulator unit is designed to control the light source such that the light source emits pulsed optical signals.

A light pulse passes the phase modulator and a first polarization component is modulated in terms of its phase. Thereupon, the light pulse is transferred to the reflector where the polarization of the light pulse is modified, and the light pulse is reflected back to the phase modulator. During the second passage, the phase modulator once again modulates a phase of a polarization component of the light pulse.

By way of example, a light pulse is designed (e.g., in respect of its duration) such that the light or one of its polarization components on its first passage (to the reflector) is not superimposed in the phase modulator with another polarization component of the same light pulse or another polarization component from another light pulse when the latter is on its second passage (from the reflector).

In another embodiment, the modulator unit can be designed such that it modulates and emits pulsed optical signals. In this example, the modulator unit can receive the pulsed optical signals from another source.

According to a further embodiment, the modulator unit further comprises a beam splitter arranged between the light source and the polarization component separator and designed to steer, in a given direction, at least a portion of the retroreflected optical signal phase-modulated by the polarization component separator.

The beam splitter is arranged to steer the optical signal, output by the polarization component separator after the second passage, at least partially structurally in a desired direction, so that the optical signal output by the polarization component separator is not only output in the direction of the light source which emits the input signal to the polarization component separator. The output signal generated thus carries information in its polarization which can be read and processed on the part of a receiver.

A circulator may also be used in place of the beam splitter in one variant.

An optical signal transmission path is specified according to a further aspect. The optical signal transmission path comprises a modulator unit as described herein and a receiver. The modulator unit acts as a signal source or part of a transmitter unit, which emits an optical signal to which information has been applied. The signal source sends the modulated optical signal in the direction of the receiver. The receiver is designed to receive optical signals. The modulator unit is arranged to emit to the output signal in the direction of the receiver.

The signal transmission path can be designed for unidirectional or bidirectional signal transmission. In the case of bidirectional signal transmission there are at least two communications units, which each comprise both a modulator unit and a receiver unit.

For example, the modulator unit described herein is implemented as part of an optical signal transmission path. Hence, the optical signal transmission path is configured to transmit information by means of polarization modulation of an optical carrier signal. The polarization modulation is introduced into the optical carrier signal by means of the modulator unit. The modulator unit prevents error phases from being introduced into a polarization component by the phase modulator if this polarization component has a polarization direction which is away from the polarization axis of the phase modulator. Moreover, the modulator unit intrinsically compensates phase errors on account of the components involved with the modulation because the polarization components pass over the same optical path twice and, in the process, the orthogonal polarization components of the optical signal are modulated in succession.

According to an embodiment, the modulator unit is arranged in a satellite. However, the modulator unit can be arranged in any other communications system.

According to a further aspect, a satellite having a modulator unit as described herein is specified.

For example, a modulator unit as described herein can be used on optical signal transmission paths which are used between two mobile units (aircraft, watercraft or ground vehicles, or satellites), between a mobile unit and a remote station on the Earth's surface, or between two stationary units.

BRIEF DESCRIPTION OF THE DRAWINGS

Exemplary embodiments are discussed in more detail below with reference to the appended drawings. The illustrations are schematic and not true to scale. The same reference signs denote identical or similar elements. In the figures.

DETAILED DESCRIPTION

Figure 1:
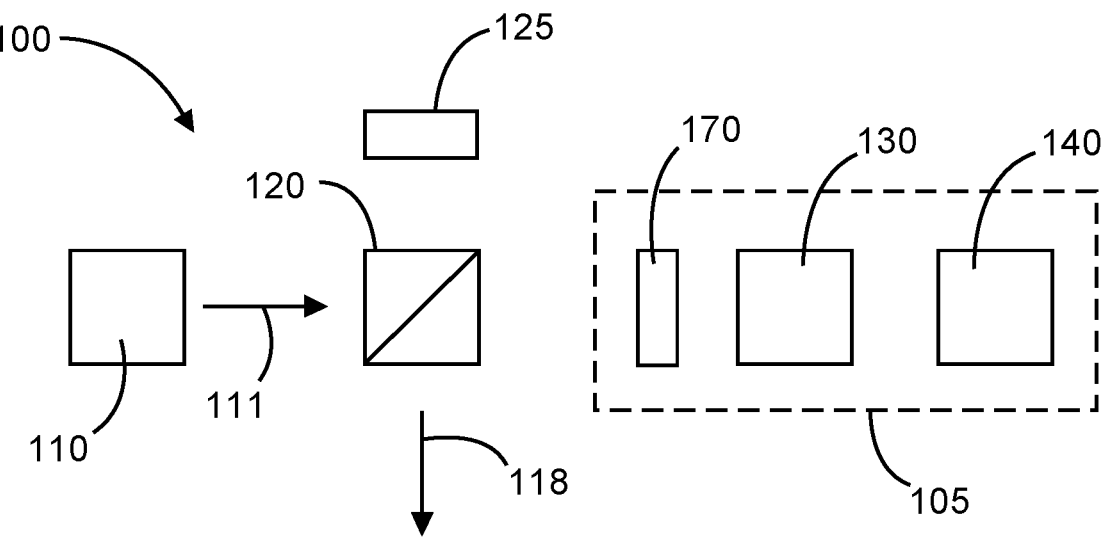
FIG. 1 shows a schematic illustration of a modulator unit.

FIG. 1 shows the structural setup of a modulator unit 100. The modulator unit 100 contains a light source 110, a beam splitter 120, a beam absorber 125, a polarization component separator 170, a (polarization-dependent or polarization-independent) phase modulator in the form of an electro-optic modulator, EOM, 130, and a reflector in the form of a Faraday mirror 140. The EOM 130, the Faraday mirror 140, and the polarization component separator 170 can be denoted jointly as a polarization modulator 105. Even if reference is made here by way of example to a Faraday mirror 140, the corresponding explanations apply in general to a reflector specified herein.

The light source 110, which for example is a laser, emits a pulsed optical signal in the form of the input signal 111. This input signal is supplied to the remaining components and the phase of its polarization components is phase modulated in order to transmit information in the polarization of the optical signal emerging from the superimposed polarization components.

In the output signal 118, the information to be transmitted is modulated into the polarization of the optical signal.

How the polarization of the optical signal is modulated is now described with reference to FIG. 2, which should be considered to complement FIG. 1.

Figure 2:
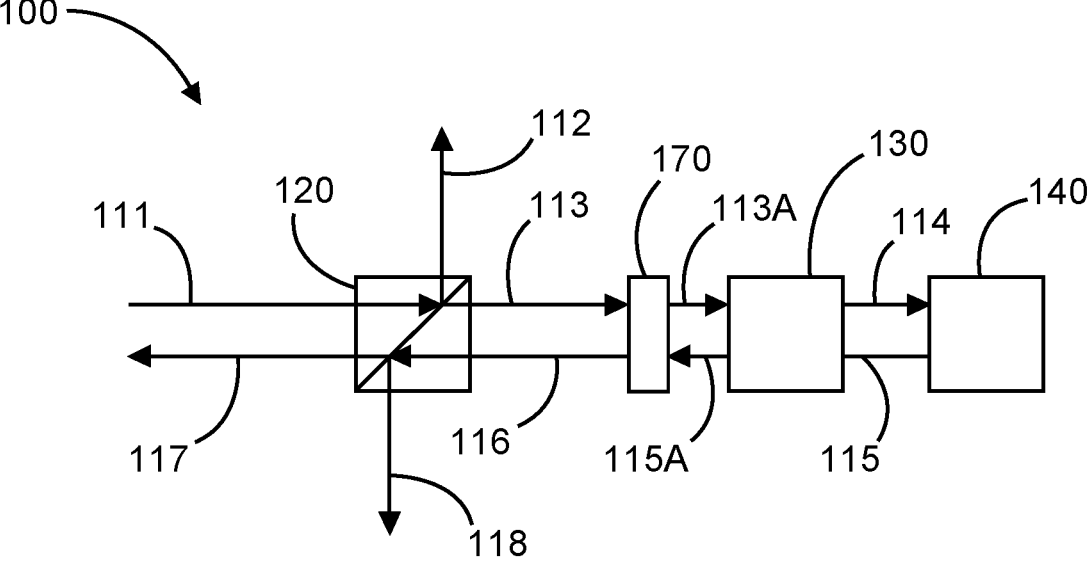
FIG. 2 shows a schematic illustration of the optical path through a modulator unit.

The path of the optical signal through the modulator unit 100 is described in FIG. 2. In this context, reference is made to the state of the optical signal at different times or at different points in the modulator unit 100.

Firstly, the input signal 111 is incident on the beam splitter 120. In this example, the beam splitter 120 is designed as a non-polarizing beam splitter. A part of the input signal 111 is steered in the direction of the beam absorber 125 as first part 112 of the split input signal and another part of the input signal 111, as second part 113 of the split input signal, passes the beam splitter 120 in the direction of the polarization component separator 170 and EOM 130.

The function of the polarization component separator 170 is described in more detail with reference to FIG. 3. In general, the function of the polarization component separator 170 is that of splitting an optical signal 113 (or the optical signal 115A in the opposite direction) into its polarization components and transmitting the latter via two different optical sections (see FIG. 3) with different signal propagation times, whereby a relative time delay between the two polarization components is introduced (in the first passage through the polarization component separator) or eliminated (in the second passage through the polarization component separator).

The optical signal 113A thus contains two polarization components, which are offset in time from one another, on the path to the EOM 130. Thus, two signals are transmitted here from a physical point of view; each polarization component represents one optical signal. The first polarization component contains light with a first polarization direction (for example a horizontal polarization) and the second polarization component contains light with a second polarization direction (for example a vertical polarization) which differs from the first polarization direction.

The EOM 130 now modulates a polarization component of the optical signal 113A by virtue of this polarization component of the signal 113A being modified in terms of its phase. At the output of the EOM 130, the optical signal 114 is available in such a way that the first polarization component with the first polarization direction is modulated in terms of phase and the second polarization component with the second polarization direction is not modulated (if the EOM is a polarization-dependent phase modulator).

The Faraday mirror 140 retroreflects the signal 114 and in the process changes the polarization of both polarization components by 90° in each case, with the result that the optical signal 114 with its two polarization components is reflected to the EOM 130 as reflected signal 115.

The optical signal 115 thus also contains two polarization components which have a time delay relative to one another. The optical signals 113, 113A, 114 contain a first polarization component with a first polarization direction and a second polarization component with a second polarization direction. In contrast thereto, the polarization directions of the two polarization components are modified in the optical signal 115: in the optical signal 115, the first polarization component contains light with the second polarization direction and the second polarization component contains light with the first polarization direction. Thus, the first and second polarization component pass through the EOM 130. However, the second polarization component is now modulated because the second polarization component contains the light with the first polarization direction whereas the first polarization component, which contains light with the second polarization direction, is not modulated.

For example, if the horizontally polarized pulse of the optical signal was modulated during the first passage of the EOM between the signals 113 and 114, then this modulation is now found in the vertically polarized pulse of the optical signal 115 during the second passage because the Faraday mirror 140 has changed the polarization through 90°. If the optical signal 115 now passes through the EOM 130 again during the second passage, then the now horizontally polarized pulse (corresponding to the vertically polarized pulse of the first passage, which experienced no change in its phase during the first passage) is modified in terms of its phase.

The optical length between the EOM 130 and the Faraday mirror 140 is dimensioned so that, within the EOM, an optical signal during the second passage is not superimposed on an optical signal during the first passage while one of these optical signals is modulated. Polarization components with different polarization directions may superimpose in the case of a polarization-dependent phase modulator since only one polarization direction is modulated. Expressed in general terms, the length of the optical path between EOM and Faraday mirror is dimensioned so that a polarization component on its second passage is not to superimposed on a polarization component on its first passage. In particular, the length of the optical path is matched to the duration of a light pulse from the light source 110 and the transmission rate.

Hence, both polarization components of the optical signal are impressed with a phase by the EOM on the same optical path. The polarization of the resultant optical signal 116 can be varied by virtue of the corresponding phase for the first polarization component during the first passage and for the second polarization component during the second passage being specified in each case.

The optical signal 116 is now phase modulated in both polarization components. The polarization of the optical signal 116, in which the information to be transmitted is contained, arises from the superposition of these two modulations.

Now, the optical signal 116 is incident on the beam splitter 120 again; a part 117 of the optical signal passes the beam splitter and a further part 118 is deflected in another direction and corresponds to the output signal to be transmitted, in the polarization of which the information to be transmitted is contained. Alternatively, it is conceivable that the output signal passes the beam splitter and the deflected signal is discarded.

Figure 3:
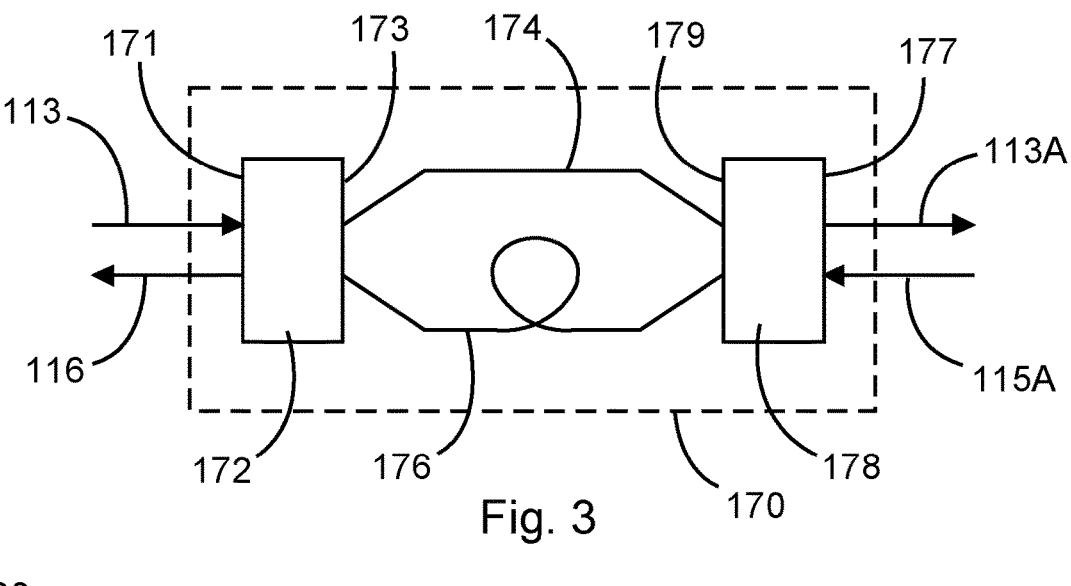
FIG. 3 shows a schematic illustration of a polarization component separator.

FIG. 3 schematically shows the structure of a polarization component separator 170. The polarization component separator 170 is designed to separate differently polarized components of an optical signal from one another and transmit these over different optical sections. The polarization component separator 170 operates bidirectionally, which is to say optical signals can pass the polarization component separator 170 in two directions (i.e., from left to right, signals 113 and 113A, and from right to left, which is to say signals 115A, 116), wherein the polarization component separator 170 implements the same function for optical signals in both directions.

The path of the optical signal 113 through the polarization component separator 170 is described below. This path is referred to as first passage. A corresponding statement then applies for the path of the optical signal 115A through the polarization component separator 170, with this path being referred to as second passage.

Initially, an optical signal 113 with two polarization components contained therein (e.g., a horizontal polarization component and a vertical polarization component) is incident on the first interface 171 of the first polarizing beam splitter 172. The first polarizing beam splitter 172 separates the two polarization components from one another. An optical signal 113 fed into the polarizing beam splitter 172 is split and results in two optical polarization components which are output at the second interface 173 of the first polarizing beam splitter 172 and are each guided via one of the two mutually separated optical sections 174, 176. For example, the first polarization component is guided over the first optical section 174 and the second polarization component is guided over the second optical section 176. The optical sections 174, 176 have different signal propagation times for optical signals or different optical path lengths. Assuming an identical or virtually identical propagation speed of optical signals over the two optical sections 174, 176, the propagation times of optical signals over the optical sections 174, 176 are of different lengths. For example, the second optical section 176 is longer than the first optical section 174.

Consequently, the two polarization components, into which the optical signal 113 has been split, experience a relative time offset as a result of the first and second optical sections 174, 176. Preferably, the time offset between the two polarization components is dimensioned such that there is no time overlap between the two polarization components after these are returned to a joint optical path on the output side, which is to say at the second polarizing beam splitter 178. This means that the first polarization component arrives at the second polarizing beam splitter 178 via the first optical section 174 and the second polarization component arrives via the second optical section 176, in such a way that the second polarization component only arrives after the first polarization component has passed the second interface 179 of the second polarizing beam splitter 178. Thus, there is a real time offset between the two polarization components.

The two polarization components reach the second interface 179 of the second polarizing beam splitter 178 via the first and second optical sections 174, 176. The two polarization components are combined by the second polarizing beam splitter and output at the first interface 177 in the direction of the phase modulator 130 via a joint optical path.

This function, which was described for the optical signal 113 passing through the polarization component separator 170, is also applied analogously to the optical signal 115A, which passes through the polarization component separator 170 in the opposite direction (in comparison with the optical signal 113).

The optical signal 113 is transmitted as a pulsed signal. The light pulses have a certain pulse duration with a start time and end time. Between the light pulses there is a specified time, depending on the transmission frequency, during which no optical signal is transmitted. Consequently, the individual polarization components are also transmitted as light pulses. After the polarization components have passed the optical sections 174, 176, there is a time offset between the light pulses of one polarization component and the light pulses of the second polarization component.

In the example of FIG. 3, the light pulse of the second polarization component, which is transmitted via the second optical section 176, can be referred to as retarded light pulse, whereas the light pulse of the first polarization component, which is transmitted via the first optical section 174, can be referred to as non-retarded light pulse. The time offset between the light pulses of the two polarization components is preferably designed such that the start time of the retarded light pulse is after the end time of the non-retarded light pulse in time, and there is a time interval which for example is greater than 0 seconds between the start time of the retarded light pulse and the end time of the non-retarded light pulse.

The time offset is defined by the respective propagation time of an optical signal over the two optical sections 174, 176. Consequently, the time offset between the two polarization components can be influenced by virtue of the signal propagation times or optical lengths of the two optical sections 174, 176 being chosen accordingly.

The optical sections 174, 176 can be realized in a fiber-connected fashion or as a free beam. What then applies to fiber-connected optical sections is that, for example, the optical fibers are polarization-maintaining optical fibers. What also applies is that the optical fiber of the first optical section 174 has a first length, which deviates from a second length of the optical fiber of the second optical section 176. In FIG. 3, this difference in length of the optical sections 174, 176 is shown as a loop in the second optical section 176. In other words, the fiber of the second optical section 176 is longer than the fiber of the first optical section 174.

The optical sections 174, 176 can also be realized as a free beam. In this case, an optical beam is steered over a predefined path, for example by means of mirrors or other optical deflection elements. The length of the optical sections can be influenced by way of the position of the mirrors.

In general, the function of the polarization component separator 170 can be described as follows: an optical signal with two polarization components is split into these two polarization components. The polarization components are transmitted via separate optical sections. One polarization component experiences a retardation on its optical section. This retardation can arise as a result of different optical lengths of the optical sections. However, it is also conceivable to integrate an optical retardation element in one optical section in order to increase the propagation time of one polarization component in comparison with the propagation time of the other polarization component. The polarization components provided with a time offset in this way are subsequently merged and transmitted again on a joint optical path. One polarization component can now be modulated. The reflector reflects the polarization components back to the phase modulator and changes their polarization directions in the process. The phase modulator now modulates the other polarization component. After the two polarization components have each passed the phase modulator twice (once from left to right and once from right to left), both polarization components have experienced a modulation. However, there still is a time offset between the two polarization components at this time. This time offset is eliminated by virtue of the polarization components passing through the polarization component separator again. The polarization components are then incident on the second polarizing beam splitter 178. The second polarizing beam splitter 178 operates in such a way that the polarization components are guided via the first optical section 174 or the second optical section 176 depending on their polarization direction. However, because the reflector 140 has changed the polarization direction of the polarization components during the reflection process, the polarization components pass over the respective other optical section during the second passage (from right to left, optical beams 115A, 116). That is to say, the polarization component which passed over the first optical section 174 during the first passage is transmitted via the second optical section 176 during the second passage, and vice versa. Thus, the polarization component not retarded during the first passage is retarded during the second passage, and vice versa. Overall, both polarization components are modulated and no longer have any time offset with respect to one another after the two polarization components have passed the polarization component separator 170 and the phase modulator 130 in both directions. The same extent of relative time delay is experienced by each polarization component in a respective direction through the polarization component separator 170, with the result that the two polarization components are coincident in time again in the optical signal 116.

During the first passage, which is to say on the path from left to right in the illustration of FIGS. 1 to 3 and in relation to the path of the optical signal 113, the polarization-dependent phase modulator 130 applies a phase modulation to a first polarization component. The other (second) polarization component is not modulated. During the second passage, which is to say on the path from right to left in the illustration of FIGS. 1 to 3 and in relation to the path of the optical signal 115A, the polarization-dependent phase modulator 130 applies a phase modulation to the second polarization component. The first polarization component is not modulated.

The phase modulator 130 is preferably controlled in such a way that it only applies a phase modulation if a first polarization component with a corresponding polarization direction passes through the phase modulator. The phase modulator does not apply a modulation if a second polarization component with a deviating polarization direction passes through the phase modulator. Thus, it is possible to ensure that no intended or unintended phase modulation, for example as a result of parasitic effects, is applied to the second polarization component. This is advantageous in that the apparatus described herein can implement a highly precise phase modulation with few errors introduced.

Once the phase modulator 130 has applied a phase modulation to the first polarization component in this way, both polarization components reach the reflector 140. The reflector 140 reflects the two polarization components and changes their polarization directions in the process, with the result that, during the second passage (from right to left; i.e., signal direction 115, 115A, 116), the first polarization component assumes the polarization direction of the second polarization component of the first passage and the second polarization component assumes the polarization direction of the first polarization component of the first passage. The phase modulator 130 now applies a phase modulation to the second polarization component without in the process applying a modulation when the first polarization component is transmitted through the phase modulator 130.

Figure 4:
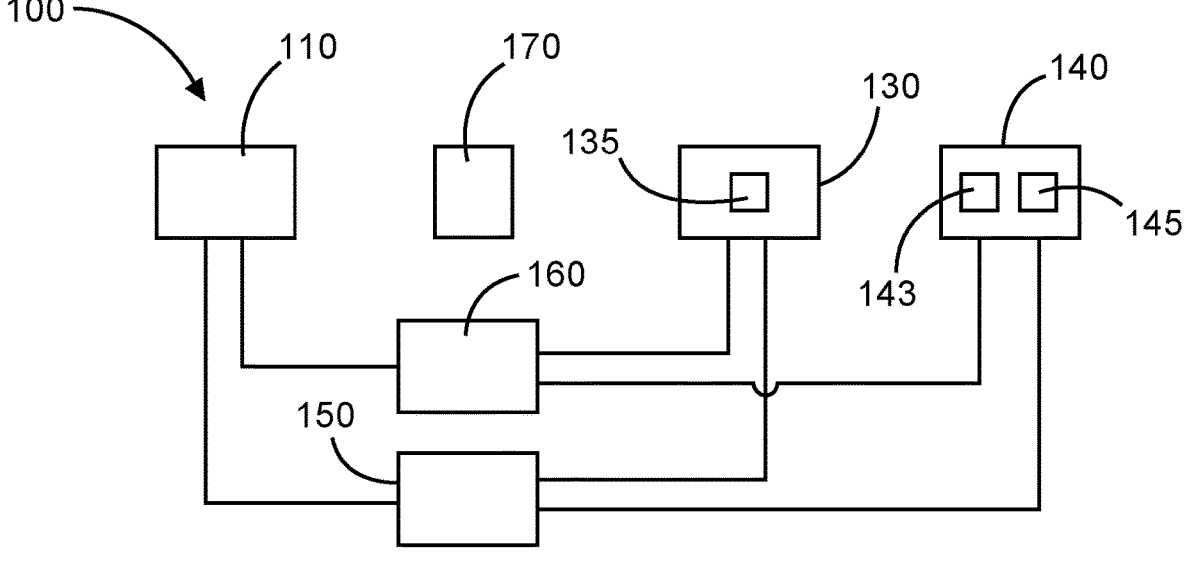
FIG. 4 shows a schematic illustration of a modulator unit.

FIG. 4 illustrates how the components of the modulator unit 100 are controlled in order to introduce the information to be transmitted into the polarization of the optical signal.

The modulator unit 100 contains a power supply 160 and a control unit 150. Both the power supply 160 and the control unit 150 are connected to the light source 110, the EOM 130, and the Faraday mirror 140. However, the control unit 150 may also be connected directly to the power supply 160 in order to specify a voltage output by the power supply 160 at the respective terminal.

The power supply 160 supplies the light source 110 with electrical energy so that the light source generates the optical signal, which acts as an input signal. Furthermore, the power supply 160 supplies the EOM 130 with electrical energy, for example a voltage, that is applied to a crystal 135. This voltage influences the crystal 135 to the effect that the phase of a polarization component of a passing optical signal is modified. By way of example, variations in the voltage can change the phase to different extents. The control unit 150 and the power supply 160 control the EOM such that the latter, during the first and second passage of the optical signal, acts as desired on the polarization component passing through the EOM and changes the phase of the influenced polarization component appropriately and as desired. In this case, the control unit and the power supply must switch correspondingly quickly and control the EOM.

The polarization of a passing optical signal is modified in the Faraday rotator 143, by 45° in the present example. The optical signal is then incident on the mirror 145, is reflected by the latter, and passes through the Faraday rotator 143 again Now, the polarization of the optical signal is modified again by 45° in the same direction, with the result that the polarization of the optical signal incident on the Faraday mirror and the polarization of the optical signal output by the Faraday mirror differ by 90°.

The control unit 150 is designed to control the power supply 160 and/or each individual component 110, 130, 140 such that these components are supplied with the energy required for their function. To this end, the control unit 150 can send control commands to the components 110, 130, 140 and/or control commands to the power supply 160.

The polarization component separator 170 is arranged between the light source 110 and the phase modulator 130. The polarization component modulator can be a passive component which requires no separate control by the control unit 150. However, it is also conceivable that the polarization component separator 170 is an active component which is supplied with energy by the power supply 160 and which is controlled by the control unit 150. By way of example, the polarization component separator 170 can be designed to vary the signal propagation time of a polarization component and the control unit 150 can be designed to specify the extent of the time delay of a polarization component brought about by the polarization component separator 170.

Figure 5:
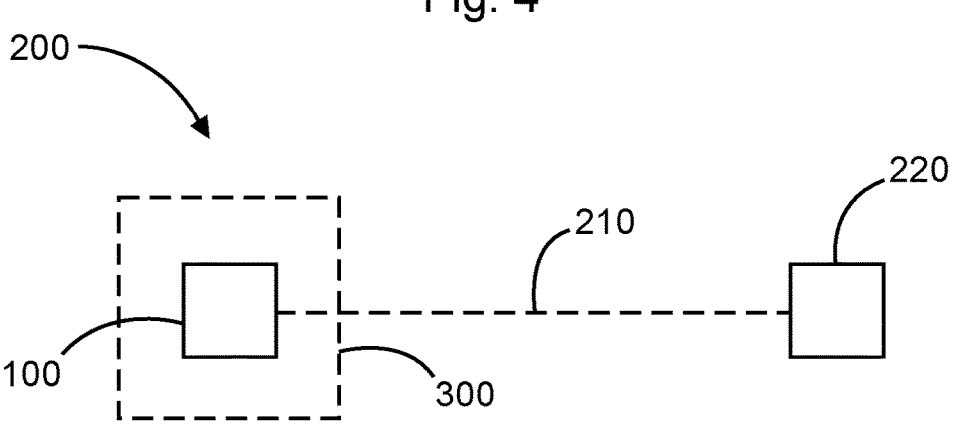
FIG. 5 shows a schematic illustration of an optical signal transmission path.

FIG. 5 shows an optical signal transmission path 200. A modulator unit 100 acts as signal source or transmitter. The modulator unit 100 modulates the polarization of an optical signal as described above and sends the modulated optical signal over a transmission path 210. For example, the transmission path 210 is a wireless optical path.

The modulated optical signal is received and processed by a remote station. The remote station is the receiver 220. The modulator unit 100 can be arranged onboard a satellite or on the Earth's surface. The receiver 220 can be arranged on the Earth's surface or onboard another satellite.

It should additionally be pointed out that "comprising" or "having" does not rule out other elements or steps, and "a", "an" or "one" does not rule out a multiplicity. It is furthermore pointed out that features or steps that have been described with reference to one of the above exemplary embodiments may also be used in combination with other features or steps of other exemplary embodiments described above. Reference signs in the claims should not be interpreted as restricting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100 Modulator unit
105 Polarization modulator
110 Light source
111 Input signal
112 First part of the split input signal
113 Second part of the split input signal
114 One-time modulated signal
115 Reflected signal
116 Two-times modulated signal
117 Returning signal
118 Output signal
120 Beam splitter
125 Beam absorber
130 Phase modulator
135 Crystal
140 Reflector, Faraday mirror
143 Faraday rotator
145 Mirror
150 Control unit
160 Power supply
170 Polarization component separator
171 First interface
172 First polarizing beam splitter

17

173 Second interface
174 First optical section
176 Second optical section
177 First interface
178 Second polarizing beam splitter
179 Second interface
200 Optical signal transmission path
210 Transmission path, optical signal
220 Receiver
300 Satellite

The invention claimed is:

1. A modulator unit for modulating the polarization of an optical signal, comprising:

a light source;
a polarization component separator;
a phase modulator; and
a reflector;

wherein the light source is configured to output an optical signal and emit the optical signal as an input signal in a direction of the polarization component separator, wherein the optical signal contains a first polarization component with a first polarization direction and a second polarization component with a second polarization direction;

wherein the polarization component separator is configured to separate the first polarization component from the second polarization component and transmit the first polarization component via a first optical section and the second polarization component via a second optical section;

wherein the first optical section is assigned a first signal propagation time and the second optical section is assigned a second signal propagation time, the first signal propagation time differing from the second signal propagation time;

wherein, as a result of a difference between the first signal propagation time and the second signal propagation time, the polarization component separator is configured to introduce a time offset between the first polarization component and the second polarization component and transmit the first polarization component and the second polarization component on a joint optical path to the phase modulator;

wherein the phase modulator is configured to modulate a first phase of the first polarization component in the first polarization direction and transfer the modulated first polarization component to the reflector;

wherein the reflector is configured to retroreflect both the first polarization component and the second polarization component in the direction of the phase modulator and in the process modify the respective polarization such that the first polarization component with the first polarization direction receives the second polarization direction and the second polarization component with the second polarization direction receives the first polarization direction;

wherein the phase modulator is configured to modulate a second phase of the retroreflected second polarization component in the first polarization direction and transmit the retroreflected first polarization component and the retroreflected second polarization component to the polarization component separator;

wherein the polarization component separator is configured to eliminate the time offset between the retroreflected first polarization component and the retroreflected second polarization component and output the retroreflected first polarization component and the retroreflected second polarization component without a time offset via a joint optical path; and wherein the modulator unit is configured to output the optical signal modulated thus as polarization-modulated output signal.

2. The modulator unit as claimed in claim 1, wherein the first optical section has a first optical path length and the second optical section has a second optical path length, the first optical path length differing from the second optical path length.

3. The modulator unit as claimed in claim 1, wherein the polarization component separator comprises a first polarizing beam splitter and a second polarizing beam splitter; and wherein the first optical section and the second optical section are arranged between the first polarizing beam splitter and the second polarizing beam splitter.

4. The modulator unit as claimed in claim 1, wherein the phase modulator comprises a crystal configured to have a voltage applied thereto and configured to change its refractive index in the process, whereby the phase of the first polarization component and/or second polarization component of the optical signal is modified.

5. The modulator unit as claimed in claim 4, wherein the modulator unit is configured to vary the voltage applied to the crystal over time.

6. The modulator unit as claimed in claim 1, wherein an absolute value of the first phase of the first polarization component of the input signal in the first polarization direction differs from an absolute value of the second phase of the second polarization component of the retroreflected optical signal in the first polarization direction.

7. The modulator unit as claimed in claim 6, wherein the phase modulator is configured to change a difference between the first phase and the second phase over time.

8. The modulator unit as claimed in claim 1, wherein the light source is configured to output light with a defined optical mode.

9. The modulator unit as claimed in claim 1, wherein the modulator unit is configured to control the light source such that the light source emits pulsed optical signals.

10. The modulator unit as claimed in claim 1, further comprising a beam splitter arranged between the light source and the polarization component separator and configured to steer, in a given direction, at least a portion of the retroreflected optical signal phase-modulated by the polarization component separator.

11. An optical signal transmission path, comprising a modulator unit as claimed in claim 1; and
a receiver configured to receive optical signals;

wherein the modulator unit is arranged to emit to the output signal in the direction of the receiver.

12. A satellite having a modulator unit as claimed in claim 1.

* * * * *